US011580645B2

(12) United States Patent
Kubota

(10) Patent No.: US 11,580,645 B2
(45) Date of Patent: Feb. 14, 2023

(54) IMAGE PROCESSING APPARATUS, IMAGE PROCESSING METHOD, AND STORAGE MEDIUM

(71) Applicant: FUJITSU LIMITED, Kawasaki (JP)

(72) Inventor: Tomonori Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 17/099,844

(22) Filed: Nov. 17, 2020

(65) Prior Publication Data
US 2021/0225001 A1 Jul. 22, 2021

(30) Foreign Application Priority Data
Jan. 22, 2020 (JP) .............................. JP2020-008645

(51) Int. Cl.
*G06T 7/11* (2017.01)
*G06N 3/08* (2006.01)
*G06V 10/764* (2022.01)
*G06V 10/82* (2022.01)

(52) U.S. Cl.
CPC ...... *G06T 7/11* (2017.01); *G06T 2207/20081* (2013.01)

(58) Field of Classification Search
CPC ................. G06K 9/6274; G06N 3/084; G06T 2207/20081; G06T 2207/20084; G06T 7/11; G06V 10/22; G06V 10/82
See application file for complete search history.

(56) References Cited

U.S. PATENT DOCUMENTS

| 5,359,699 A | 10/1994 | Tong et al. |
| 10,049,308 B1 | 8/2018 | Dhua et al. |
| 11,436,431 B2* | 9/2022 | Kubota ............... G06N 3/0454 |
| 2013/0190600 A1* | 7/2013 | Gupta .................. A61B 8/0866 |
| | | 600/407 |
| 2019/0156157 A1 | 5/2019 | Saito et al. |
| 2020/0125889 A1* | 4/2020 | Okamoto ............... G06K 9/626 |
| 2020/0311575 A1 | 10/2020 | Kong et al. |
| 2020/0342266 A1* | 10/2020 | Nitta ...................... G06N 3/084 |
| 2021/0133484 A1* | 5/2021 | Kubota ............... G06K 9/6298 |
| 2021/0174143 A1* | 6/2021 | Sato ..................... G06V 10/454 |
| 2022/0067514 A1* | 3/2022 | Ida ....................... G06N 3/0481 |
| 2022/0175325 A1* | 6/2022 | Fukushima ............ G16H 10/60 |
| 2022/0269893 A1* | 8/2022 | Dammu ............... G06V 40/172 |

FOREIGN PATENT DOCUMENTS

| JP | 2015-176355 A | 10/2015 |
| JP | 2019-074945 A | 5/2019 |
| JP | 2019-096006 A | 6/2019 |

OTHER PUBLICATIONS

Ramprasaath R. Selvaraju et al., "Grad-CAM: Visual Explanations from Deep Networks via Gradient-based Localization", IEEE International Conference on Computer Vision (ICCV) 2017, DOI: 10.1109/ICCV.2017.74, pp. 618-626 (Total 9 pages).

* cited by examiner

*Primary Examiner* — Bobbak Safaipour
(74) *Attorney, Agent, or Firm* — Fujitsu Patent Center

(57) ABSTRACT

An image processing apparatus, includes a memory; and a processor coupled to the memory and configured to: generate a trained machine learning model by learning a machine learning model using a first set of image data, output an inference result by inputting a second set of image data to the trained machine learning model, and process a region of interest at a time of inference with respect to image data for which an inference result is correct in the second set of image data.

11 Claims, 11 Drawing Sheets

IMAGE PROCESSING APPARATUS, IMAGE PROCESSING METHOD, AND STORAGE MEDIUM

CROSS-REFERENCE TO RELATED APPLICATION

This application is based upon and claims the benefit of priority of the prior Japanese Patent Application No. 2020-8645, filed on Jan. 22, 2020, the entire contents of which are incorporated herein by reference.

FIELD

The embodiments discussed herein are related to an image processing apparatus, an image processing method, and a storage medium.

BACKGROUND

In many cases, when a trained machine learning model used for image recognition is constructed by deep learning, a large amount of image data is used. On the other hand, it is often difficult to obtain image data in a real-world environment where a trained machine learning model is applied.

Therefore, in related arts, pseudo image data is generated using computer graphics (CG) or the like, and various kinds of padding processing (processing such as noise addition, smoothing, and contrast adjustment) are performed to obtain image data used for deep learning. As related arts, for example, disclosed are U.S. patent Ser. No. 10/049,308, Japanese Laid-open Patent Publication No. 2019-074945, Japanese Laid-open Patent Publication No. 2015-176355, Japanese Laid-open Patent Publication No. 2019-096006, U.S. Pat. No. 5,359,699 and Selvaraju, Ramprasaath R., et al. "Grad-cam: Visual explanations from deep networks via gradient-based localization". The IEEE International Conference on Computer Vision (ICCV), 2017, pp. 618-626, and other documents.

SUMMARY

According to an aspect of the embodiments, an image processing apparatus, includes a memory; and a processor coupled to the memory and configured to: generate a trained machine learning model by learning a machine learning model using a first set of image data, output an inference result by inputting a second set of image data to the trained machine learning model, and process a region of interest at a time of inference with respect to image data for which an inference result is correct in the second set of image data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
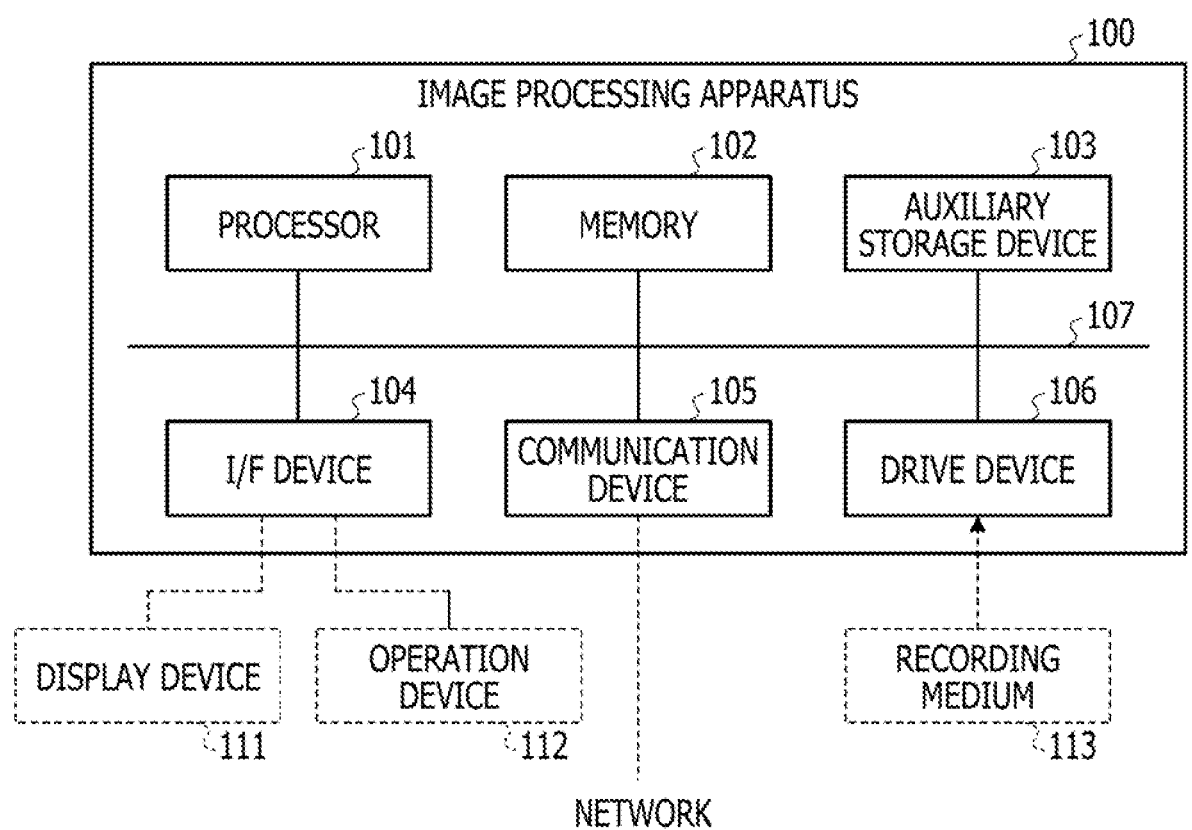
FIG. 1 is a diagram illustrating an example of a hardware configuration of an image processing apparatus.

However, in the case of performing various kinds of padding processing, there is a possibility that a region which is not necessarily important in inference is processed. In this case, such a trouble occurs that a machine learning model becomes complicated and a learning speed decreases, and an accuracy of inference does not increase due to over-learning.

In view of the above, it is desirable to generate image data useful for constructing a trained machine learning model.

Hereinafter, respective embodiments will be described with reference to the accompanying drawings. In the present specification and drawings, components having substantially same functional configurations are assigned with same reference numerals, and overlapping description is omitted.

First Embodiment

<Hardware Configuration of Image Processing Apparatus>

First, a hardware configuration of an image processing apparatus will be described. FIG. 1 is a diagram illustrating an example of a hardware configuration of the image processing apparatus. As illustrated in FIG. 1, an image processing apparatus 100 includes a processor 101, a memory 102, an auxiliary storage device 103, an interface (I/F) device 104, a communication device 105, and a drive device 106. The respective hardware components of the image processing apparatus 100 are coupled to each other via a bus 107.

The processor 101 includes various computing devices such as a central processing unit (CPU) and a graphics processing unit (GPU). The processor 101 reads various programs (for example, an image processing program to be described later, or the like) into the memory 102 and executes the programs.

The memory 102 includes a main storage device such as a read-only memory (ROM) and a random-access memory (RAM). The processor 101 and the memory 102 form a so-called computer, and the processor 101 executes various programs read into the memory 102, whereby the computer implements various functions (details of the various functions will be described later).

The auxiliary storage device 103 stores various programs, various data (for example, training data) used when the various programs are executed by the processor 101, and the like. A training data storage unit, which is an example of a storage unit, to be described later is implemented in the auxiliary storage device 103.

The I/F device 104 is a coupling device that couples a display device 111 and an operation device 112, which are examples of external devices, to the image processing apparatus 100. The I/F device 104 acquires an instruction input via the operation device 112. The I/F device 104 outputs data indicating the internal state of the image processing apparatus 100 and displays the data on the display device 111.

The communication device 105 is a communication device for communicating with another apparatus via a network.

The drive device 106 is a device in which a recording medium 113 is set. The recording medium 113 discussed herein includes a medium that records information optically, electrically, or magnetically, such as a compact disk read-only memory (CD-ROM), a flexible disk, and a magneto-optical disk. The recording medium 113 may also include a semiconductor memory and the like, such as a ROM and a flash memory, which record information electrically.

The various programs to be installed in the auxiliary storage device 103 are installed, for example, as the distributed recording medium 113 is set in the drive device 106, and the various programs recorded in the recording medium 113 are read by the drive device 106. Alternatively, the various programs to be installed in the auxiliary storage device 103 may be installed by downloading the programs from the network through the communication device 105.

<Details of Functional Configuration of Image Processing Apparatus>

Figure 2:
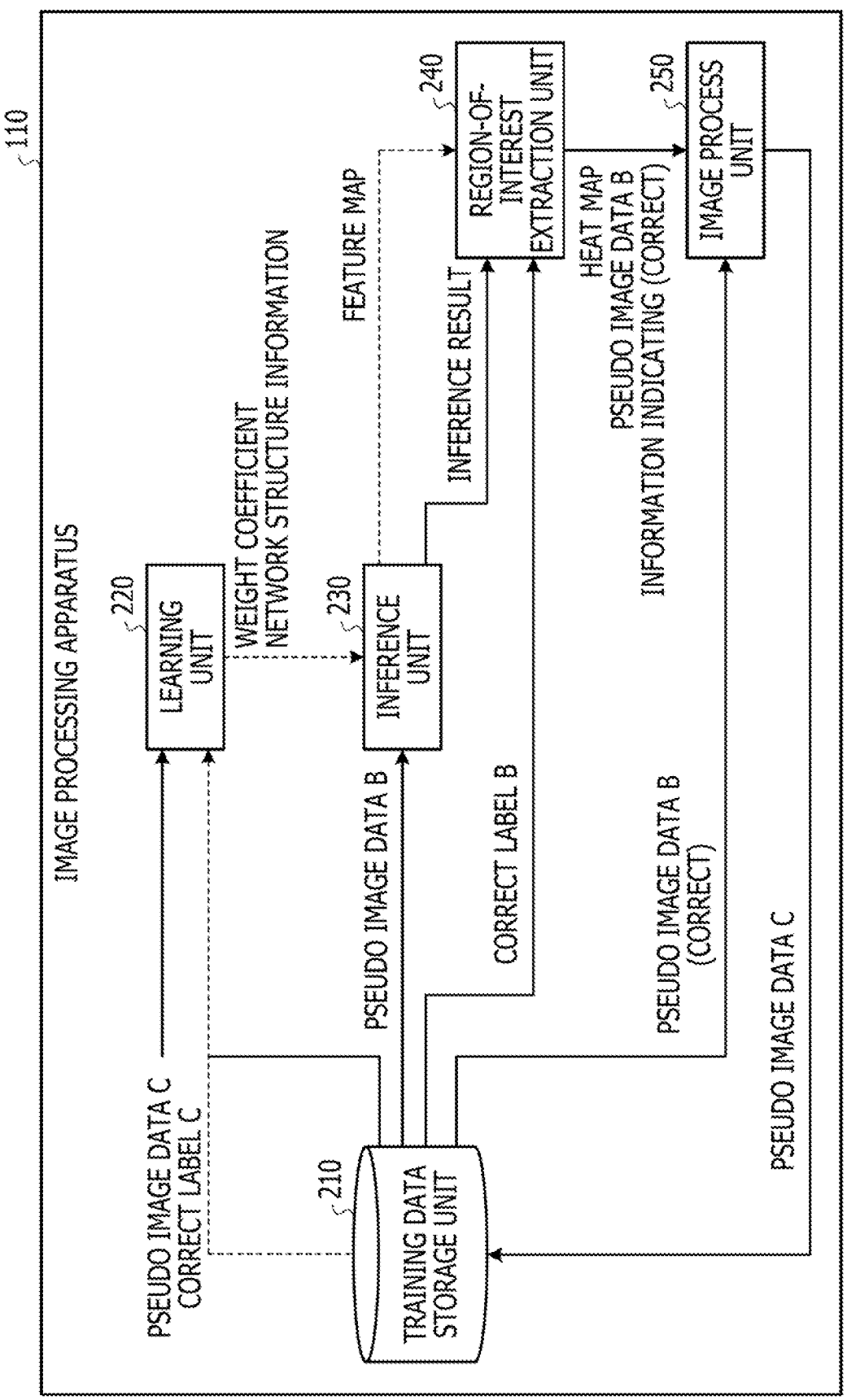
FIG. 2 is a diagram illustrating an example of a functional configuration of the image processing apparatus.

Next, a functional configuration of the image processing apparatus 100 will be described in detail. FIG. 2 is a diagram illustrating an example of a functional configuration of the image processing apparatus. As described above, an image processing program is installed in the image processing apparatus 100, and when the program is executed, the image processing apparatus 100 functions as a learning unit 220, an inference unit 230, a region-of-interest extraction unit 240, and an image process unit 250.

The learning unit 220 reads pseudo image data A and a correct label A associated with the pseudo image data A from training data stored in a training data storage unit 210. The learning unit 220 performs deep learning using the read pseudo image data A and correct label A to construct a trained machine learning model. The learning unit 220 notifies the inference unit 230 of a weight coefficient and network structure information for identifying the constructed trained machine learning model.

The inference unit 230 reads pseudo image data B different from the pseudo image data A from the training data stored in the training data storage unit 210. The inference unit 230 executes the trained machine learning model identified by the notified weight coefficient and network structure information, by inputting the read pseudo image data B to the trained machine learning model, and outputs an inference result.

The region-of-interest extraction unit 240 is an example of a generation unit. The region-of-interest extraction unit 240 reads a correct label B associated with the pseudo image data B from the training data stored in the training data storage unit 210, and compares the correct label B with the inference result output from the inference unit 230. As a result, the region-of-interest extraction unit 240 identifies the pseudo image data B (pseudo image data (correct)) for which an inference result matching the correct label B is output, among the pseudo image data B input to the inference unit 230.

The region-of-interest extraction unit 240 notifies the image process unit 250 of information indicating the identified pseudo image data B (correct). The region-of-interest extraction unit 240 acquires, from the inference unit 230, a feature map (an example of feature region information) calculated when the inference unit 230 infers the identified pseudo image data B (correct). The region-of-interest extraction unit 240 generates a heat map (which is an example of region-of-interest information and indicates a region that the trained machine learning model is interested in at the time of inference) based on the acquired feature map, and notifies the image process unit 250 of the heat map.

The image process unit 250 is an example of a process unit. The image process unit 250 reads the pseudo image data B (correct) from the training data storage unit 210 based on the information indicating the pseudo image data B (correct) notified by the region-of-interest extraction unit 240. The image process unit 250 specifies a region in which the value of the heat map is equal to or greater than a predetermined value in the read pseudo image data B (correct).

The image process unit 250 generates pseudo image data C by performing various kinds of padding processing on the specified region, and increases variation of image data processed on the specified region. The image process unit 250 stores the generated pseudo image data C in the training data storage unit 210 in association with a correct label (referred to as a correct label C).

Thus, the learning unit 220 may perform further deep learning by reading the pseudo image data C and the correct label C from the training data storage unit 210.

<Description of Training Data>

Figure 3:
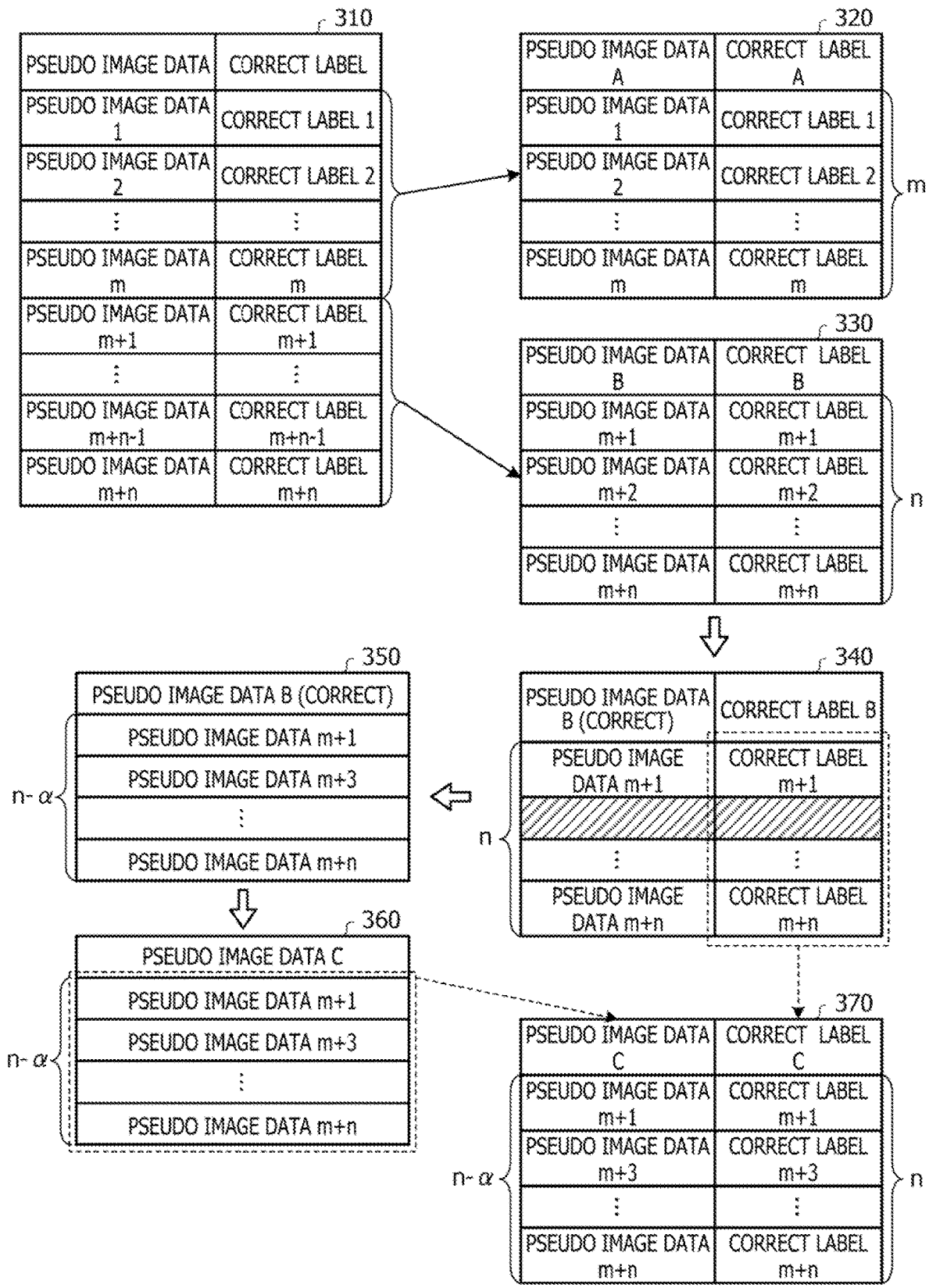
FIG. 3 is a diagram illustrating an example of training data.

Next, training data will be described. FIG. 3 is a diagram illustrating an example of training data. Training data 310 indicates training data to be stored in the training data storage unit 210 first. The training data 310 includes, as items of information, "pseudo image data" and "correct label".

The example of FIG. 3 illustrates that m+n pieces of pseudo image data are stored as the "pseudo image data". The example of FIG. 3 illustrates that m+n correct labels respectively corresponding to the pieces of pseudo image data are stored as the "correct data".

As described above, the learning unit 220 reads the pseudo image data A and the correct label A associated with the pseudo image data A from the training data 310 that is first stored in the training data storage unit 210.

In FIG. 3, training data 320 is training data read from the training data 310 by the learning unit 220, including the "pseudo image data A" and the "correct label A" associated with the "pseudo image data A". The example of FIG. 3 illustrates that m pieces of pseudo image data are read as the "pseudo image data A". The example of FIG. 3 illustrates that m corresponding correct labels are read as the "correct label A".

The learning unit 220 performs deep learning using the training data 320 to construct a trained machine learning model.

In FIG. 3, training data 330 is training data read from the training data 310 by the inference unit 230, including the "pseudo image data B" and the "correct label B" associated with the "pseudo image data B". The example of FIG. 3 illustrates that n pieces of pseudo image data are read as the "pseudo image data B". The example of FIG. 3 illustrates that n corresponding correct labels are read as the "correct label B".

The inference unit 230 executes the trained machine learning model by inputting the pseudo image data stored in the "pseudo image data B" of the training data 330 to the trained machine learning model, and outputs an inference result.

The region-of-interest extraction unit 240 compares the inference result output from the inference unit 230 with the correct label stored in the "correct label B" of the training data 330. As a result, the region-of-interest extraction unit 240 identifies, among the pieces of pseudo image data stored in the "pseudo image data B" of the training data 330, pseudo image data for which an inference result indicating that the pseudo image data matches the correct label stored in the "correct label B" of the training data 330 is output.

In FIG. 3, pseudo image data stored in the "pseudo image data B (correct)" of training data 340 indicates pseudo image data for which an inference result indicating that the pseudo image data matches the correct label is output by the inference unit 230.

In the training data 340, a row with hatched lines indicates pseudo image data for which an inference result indicating that the pseudo image data matches the correct label is not output by the inference unit 230, and the correct label thereof. In the case of the training data 340, for example, pseudo image data m+2 indicates pseudo image data for which an inference result indicating that the pseudo image data matches the correct label is not output by the inference unit 230.

Training data 350 is obtained by extracting, from the training data 340, pseudo image data excluding pseudo image data for which an inference result indicating that the pseudo image data matches the correct label is not output by the inference unit 230. The example of the training data 350 indicates that, among the n pieces of pseudo image data stored in the "pseudo image data B" of the training data 330, for a pieces of pseudo image data, an inference result indicating that the pseudo image data matches the correct label is not output by the inference unit 230.

The image process unit 250 reads (n−a) pieces of pseudo image data stored in the "pseudo image data B (correct)" of the training data 350, and performs various kinds of padding processing on a region in which the value of the heat map is equal to or greater than a predetermined value.

In the "pseudo image data C" of training data 360, pseudo image data subjected to various kinds of padding processing by the image process unit 250 is stored. The correct label associated with the pseudo image data before the padding processing is performed is associated with the pseudo image data stored in the "pseudo image data C" of the training data 360.

In FIG. 3, training data 370 is training data stored in the training data storage unit 210 by associating the pseudo image data stored in the "pseudo image data C" of the training data 360 with the correct label stored in the "correct label B" of the training data 340. The training data 370 is used for further deep learning by the learning unit 220.

<Details of Learning Unit>

Figure 4:
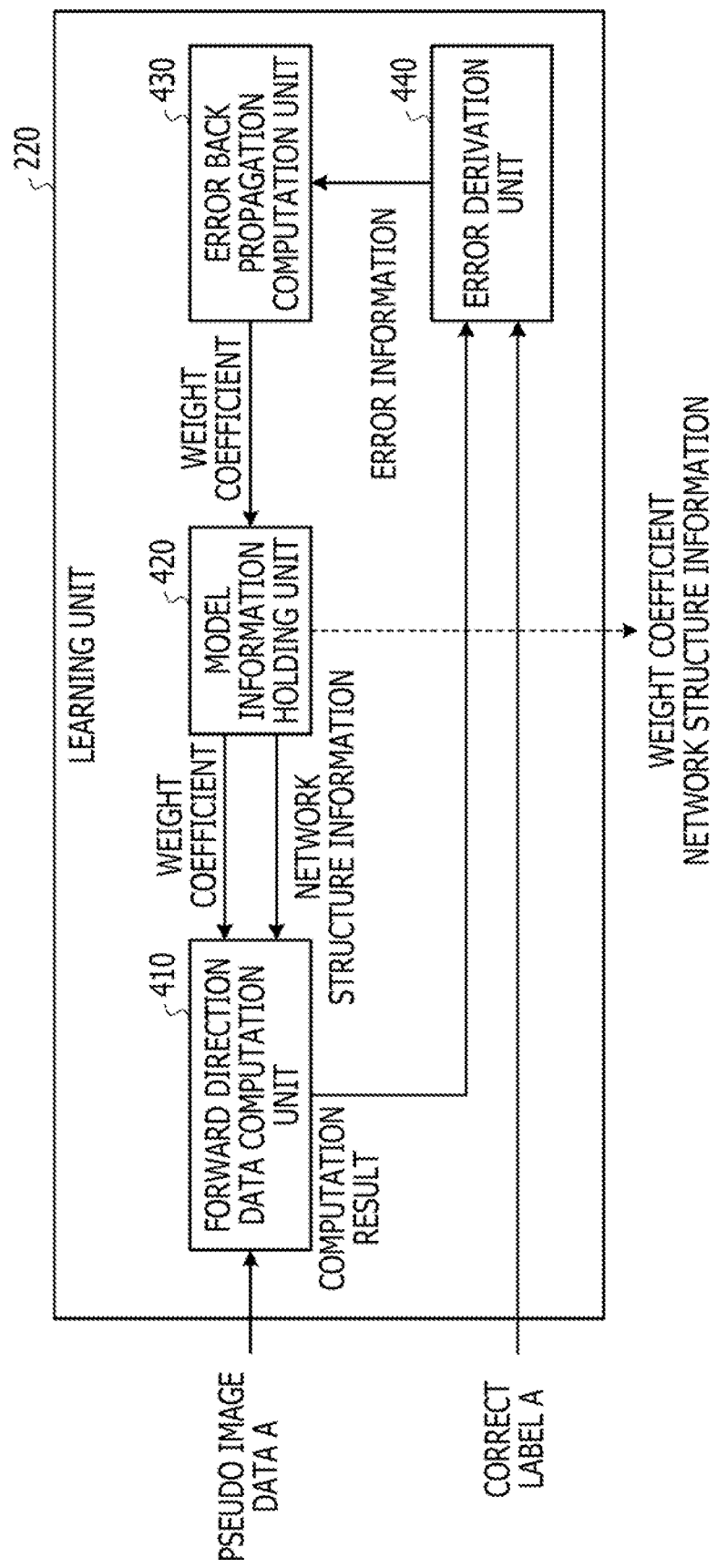
FIG. 4 is a diagram illustrating details of a learning unit.

Next, a functional configuration of the learning unit 220 will be described in detail. FIG. 4 is a diagram illustrating details of the learning unit. As illustrated in FIG. 4, the learning unit 220 includes a forward direction data computation unit 410, a model information holding unit 420, an error back propagation computation unit 430, and an error derivation unit 440.

The forward direction data computation unit 410 is a machine learning model, and when pseudo image data stored in the "pseudo image data A" of the training data 320 is input, the forward direction data computation unit 410 executes a forward direction computation and outputs a computation result to the error derivation unit 440.

The error derivation unit 440 compares the computation result output from the forward direction data computation unit 410 with the correct label stored in the "correct label A" of the training data 320, and derives an error. The error derivation unit 440 notifies the error back propagation computation unit 430 of error information indicating the derived error.

The error back propagation computation unit 430 calculates a weight coefficient of each layer of the machine learning model based on the error information notified by the error derivation unit 440, and notifies the model information holding unit 420 of the weight coefficient.

The model information holding unit 420 holds the weight coefficient notified by the error back propagation computation unit 430 and notifies the forward direction data computation unit 410 of the weight coefficient. As a result, the forward direction data computation unit 410 may execute the forward direction computation based on the notified weight coefficient.

The model information holding unit 420 holds network structure information of the forward direction data computation unit 410, which is a machine learning model.

Deep learning is completed when the learning unit 220 inputs all pieces of pseudo image data stored in the "pseudo image data A" of the training data 320 to the forward direction data computation unit 410. When deep learning is completed, the learning unit 220 notifies the inference unit 230 of the weight coefficient and the network structure information held in the model information holding unit 420.

<Details of Inference Unit>

Figure 5:
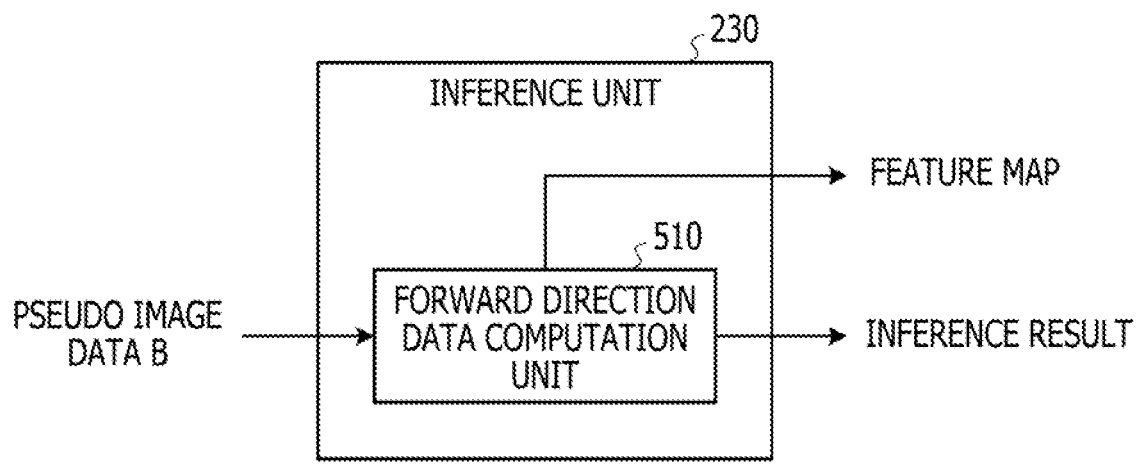
FIG. 5 is a diagram illustrating details of an inference unit.

Next, a functional configuration of the Inference unit 230 will be described in detail. FIG. 5 is a diagram illustrating details of the inference unit. As illustrated in FIG. 5, the inference unit 230 includes a forward direction data computation unit 510.

The forward direction data computation unit 510 is a trained machine learning model identified by the weight coefficient and the network structure information notified by the learning unit 220.

The forward direction data computation unit 510 executes a forward direction computation and calculates an inference result when pseudo image data stored in the "pseudo image data B" of the training data 330 is input. The inference result calculated by the forward direction data computation unit 510 is output to the region-of-interest extraction unit 240 by the inference unit 230.

A feature map calculated when the forward direction data computation unit 510, which is a trained machine learning model, executes the forward direction computation is output to the region-of-interest extraction unit 240 by the inference unit 230.

<Details of Region-of-Interest Extraction Unit>

Figure 6:
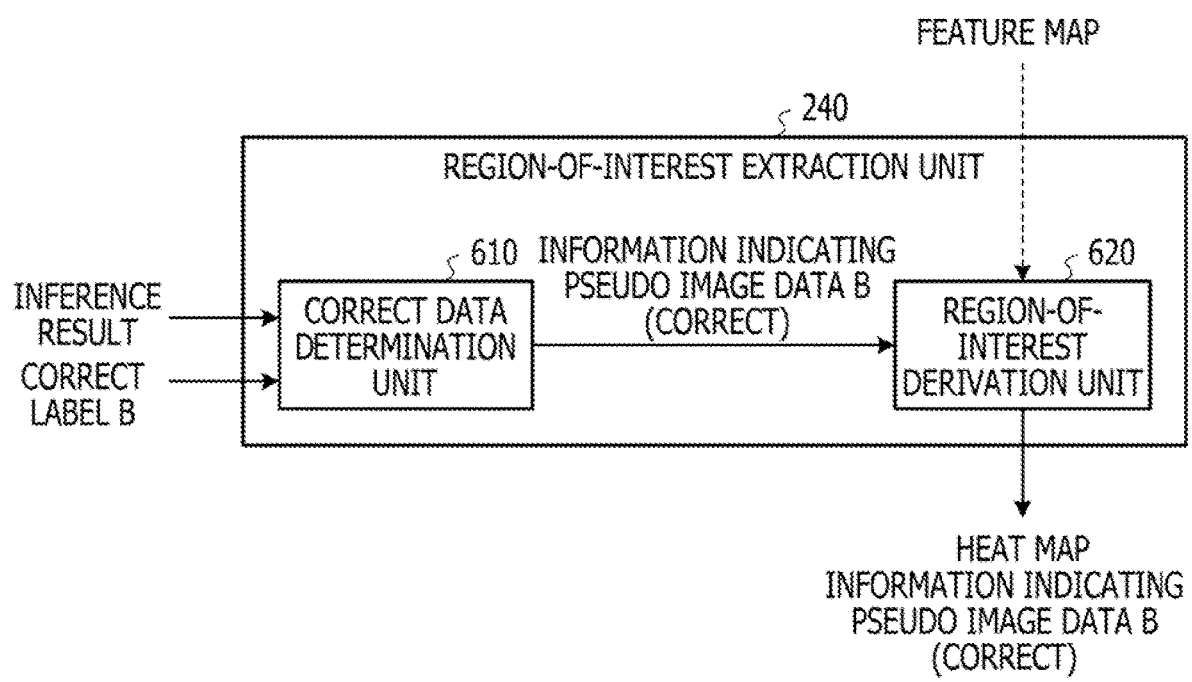
FIG. 6 is a diagram illustrating details of a region-of-interest extraction unit.

Next, a functional configuration of the region-of-interest extraction unit 240 will be described in detail. FIG. 6 is a diagram illustrating details of the region-of-interest extraction unit. As illustrated in FIG. 6, the region-of-interest extraction unit 240 includes a correct data determination unit 610 and a region-of-interest derivation unit 620.

The correct data determination unit 610 acquires the inference result output from the inference unit 230 and the correct label stored in the "correct label B" of the training data 330. The correct data determination unit 610 compares the acquired inference result with the acquired correct label to identify the pseudo image data (pseudo image data B (correct)) for which the inference result indicating that the pseudo image data matches the correct label is output, among the pieces of pseudo image data stored in the "pseudo image data B" of the training data 330. The correct data determination unit 610 notifies the region-of-interest derivation unit 620 of information indicating the identified pseudo image data B (correct).

The region-of-interest derivation unit 620 acquires the feature map output from the inference unit 230 and performs region-of-interest derivation processing by the Gradient-weighted Class Activation Mapping (Grad-CAM) method to generate a heat map. The region-of-interest derivation unit 620 notifies the image process unit 250 of the generated heat map together with the information indicating the identified pseudo image data B (correct).

Figure 7:
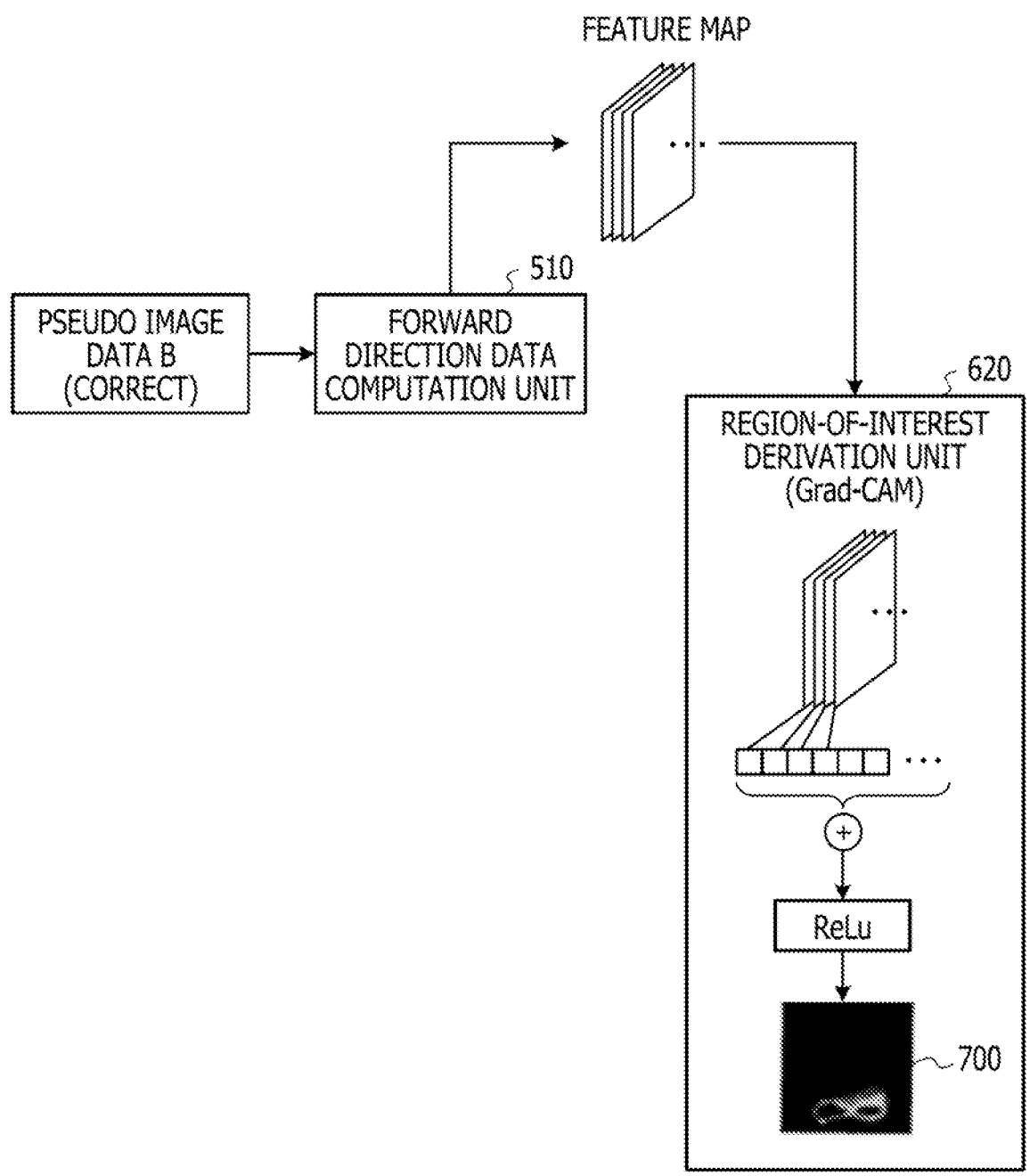
FIG. 7 is a diagram illustrating an outline of region-of-interest derivation processing by the Grad-CAM method.

FIG. 7 is a diagram illustrating an outline of the region-of-interest derivation processing by the Grad-CAM method. The region-of-interest derivation unit 620 acquires feature maps calculated when the pseudo image data extracted as the "pseudo image data B (correct)" of the training data 350 among the pieces of pseudo image data stored in the "pseudo image data B" of the training data 340 is input to the forward direction data computation unit 510.

The region-of-interest derivation unit 620 adds the acquired feature maps and inputs the sum to an activation function of rectifier linear unit (ReLU) to generate a heat map 700.

Figure 8:
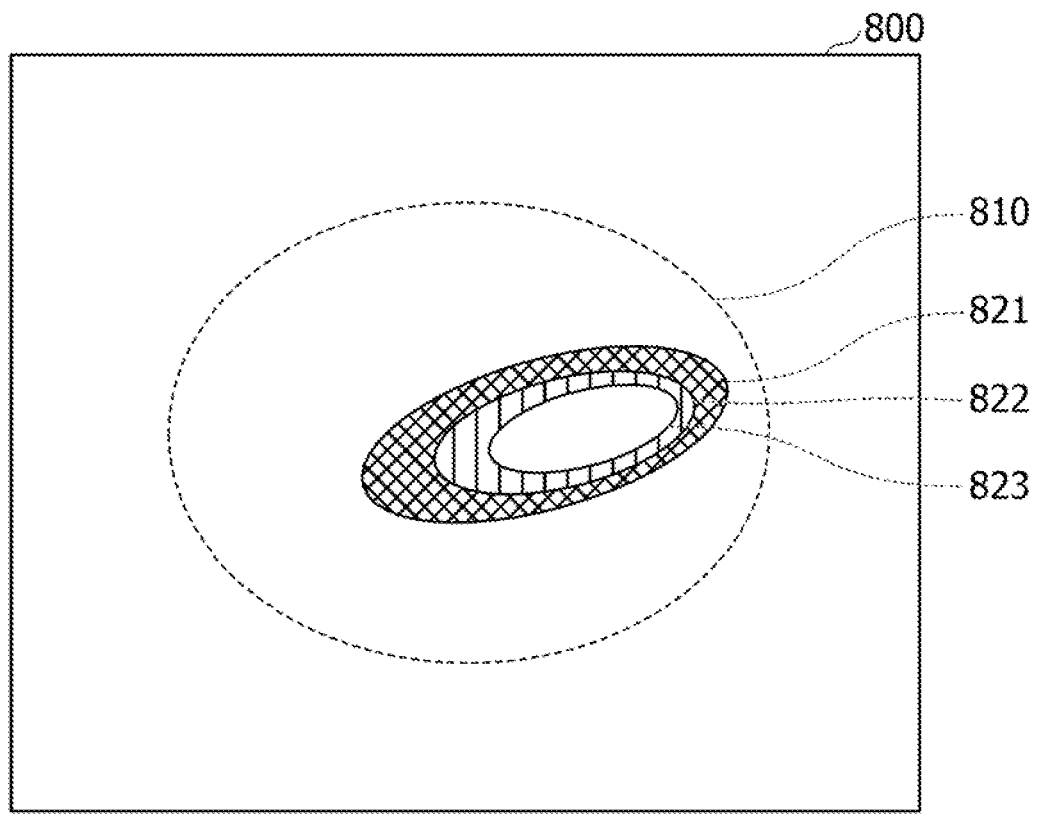
FIG. 8 is a first diagram illustrating a specific example of a heat map.

FIG. 8 is a diagram illustrating a specific example of a heat map, and is a diagram illustrated so that a correspondence relationship with the pseudo image data B (correct) may be understood. In FIG. 8, each region of the heat map is schematically illustrated for simplification of description.

In FIG. 8, reference numeral 800 is an example of pseudo image data stored in the "pseudo image data B (correct)" of the training data 350, which is specified by the correct data determination unit 610 and read by the image process unit 250. Reference numeral 810 indicates an inference target object included in the pseudo image data (reference numeral 800). Reference numerals 821 to 823 schematically indicate the heat map 700.

The region indicated by the reference numeral 821 is a region where the value of the heat map value is T1 or more, the region indicated by the reference numeral 822 is a region where the value of the heat map value is T2 or more, and the region indicated by the reference numeral 823 is a region where the value of the heat map value is T3 or more (where T1<T2<T3).

As illustrated in FIG. 8, the heat map (reference numerals 821 to 823) is distributed in a partial region of the inference target object (reference numeral 810) included in the pseudo image data (reference numeral 800). Therefore, the image process unit 250 performs padding processing on a partial region (a region where the trained machine learning model is interested in at the time of inference) of the inference target object (reference numeral 810).

In this manner, by performing the padding processing on a region where the trained machine learning model is truly interested in at the time of inference, image data useful for constructing a trained machine learning model may be generated. The region where the trained machine learning model is truly interested in at the time of inference does not necessarily coincide with a region that may be demarcated by a human.

For example, according to the present embodiment, it is possible to solve a problem that is difficult to be solved by general padding processing performed on a region based on a shape, a property, or the like that may be grasped by a human (a problem that image data useful for constructing a trained machine learning model may not be generated).

The region-of-interest derivation processing performed by the region-of-interest derivation unit 620 may be performed using another method by which a region where the inference unit 230 is interested in at the time of inference may be derived. As an example, a method other than the Grad-CAM method described in NPL 1 (a guided back-propagation method, a guided Grad-CAM method, or the like) may be given.

In a case of a method in which the region of interest may not be directly obtained by a heat map, information on the degree of interest of the region of interest indicated by the method is treated as a heat map. When this method is applied to the region-of-interest derivation unit 620, an expression method that is based on information on the degree of interest of the region of interest and that provides the same effect as a heat map may be used.

<Details of Image Process Unit>

Figure 9:
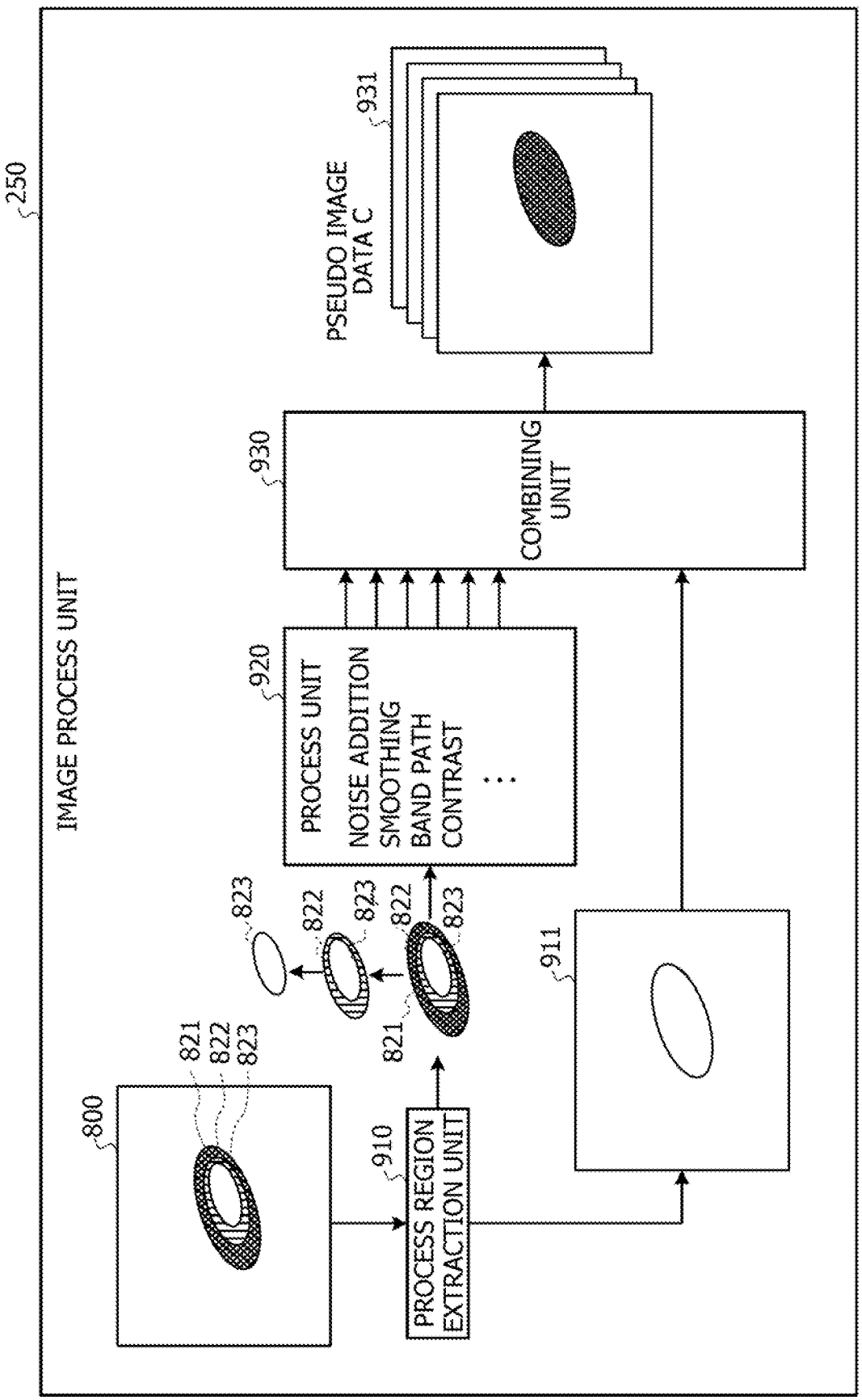
FIG. 9 is a diagram illustrating details of an image process unit.

Next, a functional configuration of the image process unit 250 will be described in detail. FIG. 9 is a diagram illustrating details of the image process unit. As illustrated in FIG. 9, the image process unit 250 includes a process region extraction unit 910, a process unit 920, and a combining unit 930.

The process region extraction unit 910 acquires pseudo image data (reference numeral 800) in which a heat map indicated by the reference numerals 821 to 823 is generated. The process region extraction unit 910 divides the pseudo image data (reference numeral 800) into regions of the heat map indicated by the reference numerals 821 to 823 and pseudo image data (reference numeral 911) not including the heat map.

The process unit 920 performs various kinds of padding processing on the regions of the heat map indicated by the reference numerals 821 to 823 in the pseudo image data (reference numeral 800), the regions being notified by the process region extraction unit 910. The padding processing performed by the process unit 920 includes processing such as noise addition processing, smoothing processing, band-pass filtering processing, and contrast enhancement processing.

For example, the process unit 920 performs various kinds of padding processing on the region of the heat map indicated by the reference numeral 821 in the pseudo image data (reference numeral 800). For example, the process unit 920 does not perform the padding processing on the region of the heat map indicated by the reference numeral 821, and performs various kinds of padding processing on the region of the heat map indicated by the reference numeral 822. For example, the process unit 920 does not perform the padding processing on the regions of the heat map indicated by the reference numerals 821 and 822, and performs various kinds of padding processing on the region of the heat map indicated by the reference numeral 823. The process unit 920 notifies the combining unit 930 of the regions of the heat map indicated by the reference numerals 821 to 823 on which the padding processing has been performed.

The combining unit 930 combines the regions of the heat map indicated by the reference numerals 821 to 823, which are notified from the process unit 920 and on which the padding processing has been performed, and the pseudo image data (reference numeral 911) which is notified from the process region extraction unit 910 and which does not include the heat map.

The combining unit 930 combines the region indicated by the reference numeral 821 in the pseudo image data (reference numeral 911) with, for example: an image obtained by performing noise addition processing on the region of the heat map indicated by the reference numeral 821, an image obtained by performing smoothing processing on the region of the heat map indicated by the reference numeral 821, and the like, respectively; an image obtained without performing the padding processing on the region of the heat map indicated by the reference numeral 821, but by performing noise addition processing on the region of the heat map indicated by the reference numeral 822, an image obtained without performing the padding processing on the region of the heat map indicated by the reference numeral 821, but by performing smoothing processing on the region of the heat map indicated by the reference numeral 822, and the like, respectively; and an image obtained without performing the padding processing on the regions of the heat map indicated by the reference numerals 821 and 822, but by performing noise addition processing on the region of the heat map indicated by the reference numeral 823, an image obtained without performing the padding processing on the regions of the heat map indicated by the reference numerals 821 and 822, but by performing smoothing processing on the region of the heat map indicated by the reference numeral 823, and the like, respectively.

Thus, the combining unit 930 generates pseudo image data 931 stored as the "pseudo image data C". The combining unit 930 stores, in the training data storage unit 210, the generated pseudo image data 931 as the "pseudo image data C" in association with the correct label.

<Flow of Image Processing>

Figure 10:
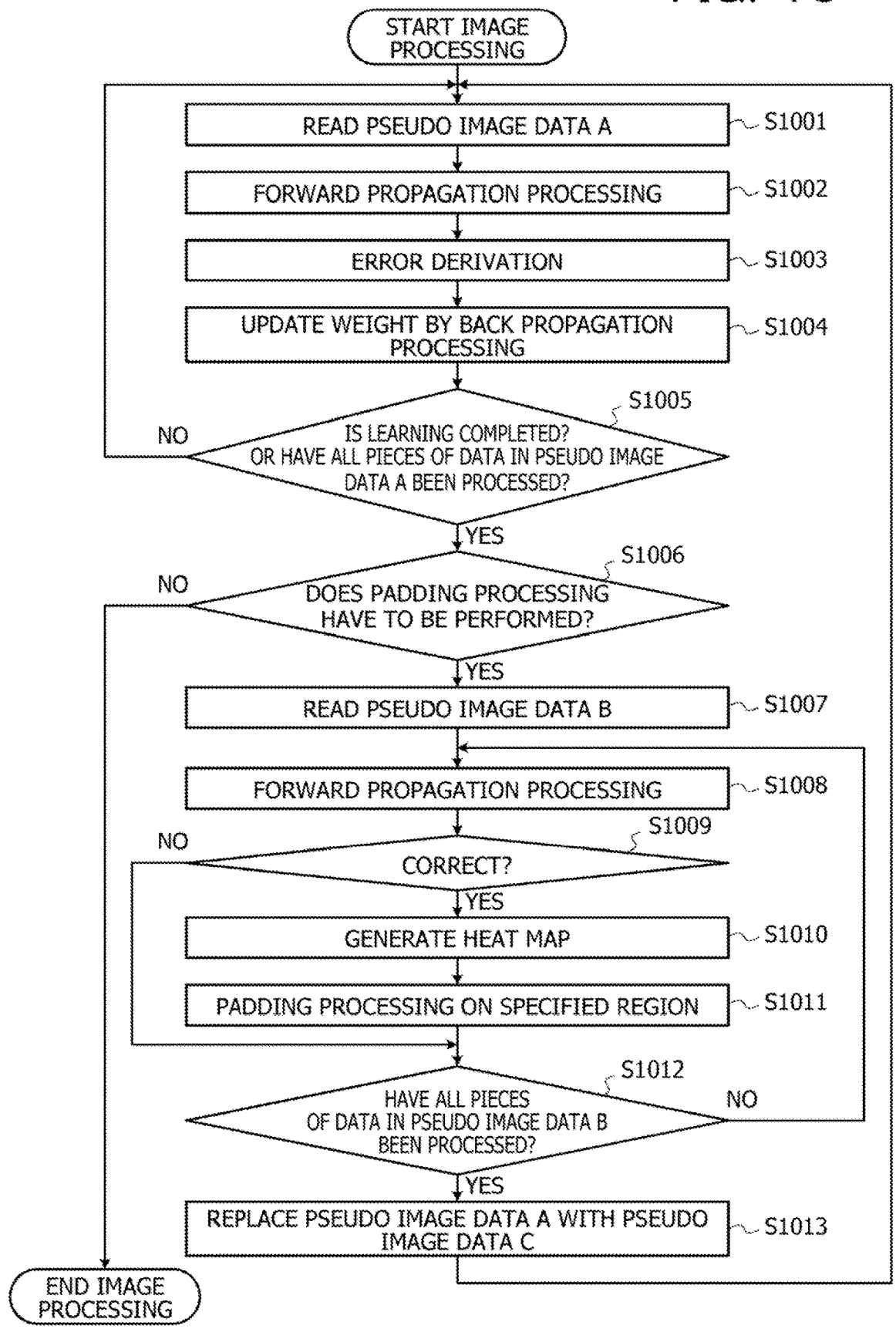
FIG. 10 is a flowchart illustrating a flow of image processing.

Next, a flow of image processing by the image processing apparatus 100 will be described. FIG. 10 is an example of a flowchart illustrating a flow of image processing.

In step S1001, the learning unit 220 reads the training data 320 from the training data 310 in the training data storage unit 210.

In step S1002, the learning unit 220 inputs the pseudo image data stored in the "pseudo image data A" of the training data 320 to the machine learning model, and causes the machine learning model to execute forward propagation processing.

In step S1003, the learning unit 220 derives an error by comparing the computation result with the correct label stored in the "correct label A" of the training data 320.

In step S1004, the learning unit 220 updates the weight coefficient of the machine learning model by back propagation of the error information.

In step S1005, the learning unit 220 determines whether deep learning of the machine learning model is completed. Alternatively, the learning unit 220 determines whether all pieces of pseudo image data stored in the "pseudo image data A" have been input to the machine learning model.

When it is determined in step S1005 that the deep learning is not completed, or when it is determined that there is pseudo image data that has not been input to the machine learning model (in a case of No in step S1005), the process returns to step S1001.

On the other hand, when it is determined in step S1005 that the deep learning is completed, or when it is determined that all pieces of the pseudo image data have been input to the machine learning model (in a case of Yes in step S1005), the process proceeds to step S1006.

In step S1006, the inference unit 230 determines whether padding processing has to be performed. When it is determined in step S1006 that the padding processing does not have to be performed (in a case of No in step S1006), the image processing is ended.

On the other hand, when it is determined in step S1006 that the padding processing has to be performed (in a case of Yes in step S1006), the process proceeds to step S1007.

In step S1007, the training data 330 is read from the training data 310 in the training data storage unit 210.

In step S1008, the inference unit 230 inputs the pseudo image data stored in the "pseudo image data B" of the training data 330 to the trained machine learning model, and causes the trained machine learning model to execute forward propagation processing.

In step S1009, the region-of-interest extraction unit 240 compares the inference result output from the inference unit 230 by executing the forward propagation processing with the correct label stored in the "correct label B" of the training data 330, and determines whether the inference result matches the correct label.

When it is determined in step S1009 that the inference result does not match the correct label (in a case of No in step S1009), the process proceeds to step S1012.

On the other hand, when it is determined in step S1009 that the inference result matches the correct label (in a case of Yes in step S1009), the process proceeds to step S1010.

In step S1010, the region-of-interest extraction unit 240 generates a heat map based on the feature map.

In step S1011, the image process unit 250 reads the pseudo image data stored in the "pseudo image data B (correct)" of the training data 350, and specifies a region in which the value of the heat map is equal to or greater than a predetermined value. The image process unit 250 performs padding processing on the specified region.

In step S1012, the inference unit 230 determines whether all pieces of pseudo image data stored in the "pseudo image data B" of the training data 330 have been input to the trained machine learning model. When it is determined in step S1012 that there is pseudo image data that has not been input to the trained machine learning model (in a case of No in step S1012), the process returns to step S1008.

On the other hand, when it is determined in step S1012 that all pieces of the pseudo image data have been input to the trained machine learning model (in a case of Yes in step S1012), the process proceeds to step S1013.

In step S1013, the image process unit 250 stores the pseudo image data subjected to the padding processing as the "pseudo image data C", in the training data 370 in the training data storage unit 210 in association with the correct label. As a result, the learning unit 220 replaces the training data 310 in the training data storage unit 210 with the training data 370, and repeats the processing of steps S1001 to S1013. The learning unit 220 repeats the processing of steps S1001 to S1013 until it is determined in step S1006 that the padding processing does not have to be performed.

As is clear from the above description, the image processing apparatus 100 according to the first embodiment performs deep learning on a machine learning model using the training data 320, outputs an inference result by inputting the training data 330 to a trained machine learning model, and for pseudo image data in the training data 330 for which the inference result is correct, processes a region of interest at the time of inference.

As described above, the image processing apparatus 100 according to the first embodiment performs padding processing on a region of interest at the time of inference for pseudo image data for which the inference result is correct. This makes it possible to generate pseudo image data useful for constructing a trained machine learning model.

Second Embodiment

In the first embodiment, description is given of a case in which the pseudo image data (reference numeral 800) includes one inference target object. However, the number of inference target objects included in the pseudo image data (reference numeral 800) is not limited to one.

On the other hand, when a plurality of inference target objects are included in the pseudo image data (reference numeral 800), the respective objects do not necessarily have similar values of a heat map.

In a case where the value of the heat map is different for each object, when the process region extraction unit 910 extracts only a region of the heat map having a predetermined value or more, a situation may occur in which only a region of the heat map distributed over one object is extracted. Therefore, in the second embodiment, regions of the heat map are extracted for each object.

Figure 11A:
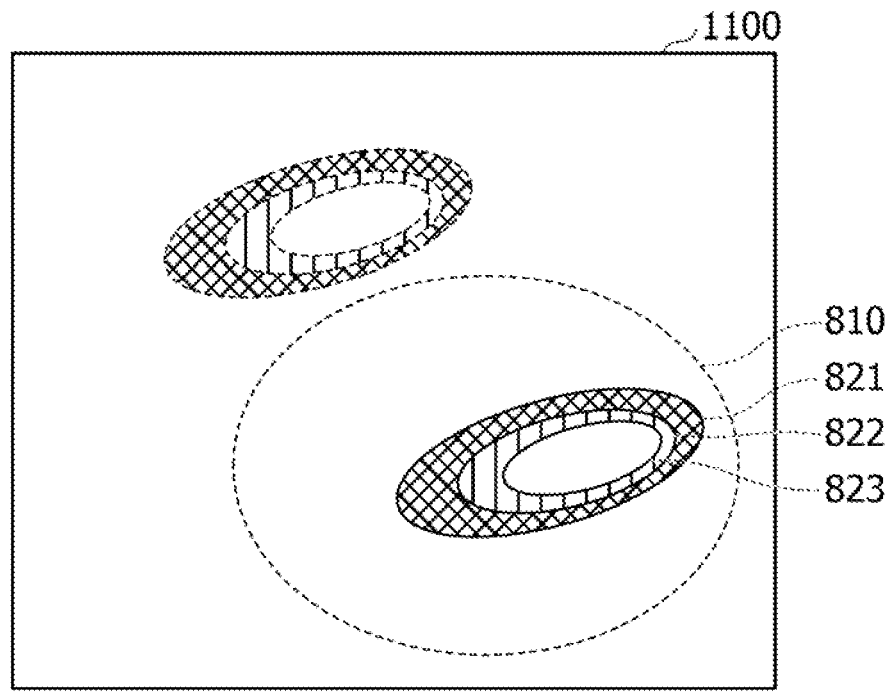
FIGS. 11A and 11B are second diagrams illustrating a specific example of a heat map.
Figure 11B:
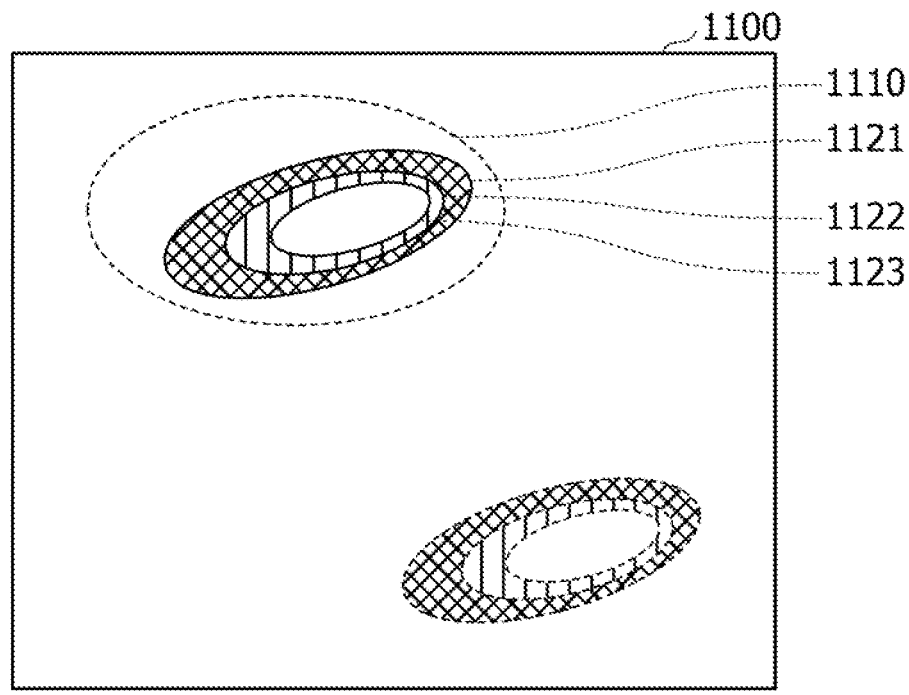

FIGS. 11A and 11B are second diagrams illustrating a specific example of a heat map, and illustrates a state in which a plurality of objects (an object indicated by the reference numeral 810 and an object indicated by reference numeral 1110) are included in pseudo image data 1100. FIG. 11A illustrates a state in which padding processing is performed on regions of a heat map (reference numerals 821 to 823) distributed over the object indicated by the reference numeral 810. On the other hand, FIG. 11B illustrates a state in which padding processing is performed on regions of a heat map (reference numerals 1121 to 1123) distributed over the object indicated by the reference numeral 1110.

In this way, by extracting regions of a heat map on an object-by-object basis and performing padding processing, even when a plurality of objects are included in pseudo image data, padding processing may be performed for each object.

Third Embodiment

In the first and second embodiments, a description is given of a case in which the region-of-interest derivation unit 620 generates a heat map using the Grad-CAM method. However, the method of generating a heat map by the region-of-interest derivation unit 620 is not limited to the Grad-CAM method, and a heat map may be generated using another method.

In the first and second embodiments, the learning unit 220, the inference unit 230, the region-of-interest extraction unit 240, and the image process unit 250 are implemented in the image processing apparatus 100. However, the learning unit 220 and the inference unit 230 may be implemented in a different apparatus. Similarly, the training data storage unit 210 may be implemented in an external auxiliary storage device.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
a memory; and
a processor coupled to the memory and configured to:
generate a trained machine learning model by learning a machine learning model using a first set of image data;
output an inference result by inputting a second set of image data to the trained machine learning model; and
generate pseudo images by changing a parameter of a region of interest of an image in the second set of image data at a time of inference with respect to image data for which an inference result is correct, the region having a heat map value equal to or greater than a threshold;
store, in the memory, a third set of image data that is the second set of image data to which the generated pseudo images are added; and
re-train the trained machine learning model by using the third set of image data.

2. The image processing apparatus according to claim 1, wherein the processor is further configured to:
identify the image data for which the inference result is correct in the second set of image data; and
generate region-of-interest information indicating the region of interest at a time of inference based on feature region information calculated at the time of inference for the identified image data for which the inference result is correct.

3. The image processing apparatus according to claim 2, wherein the processor is further configured to store image data obtained by processing the region of interest at a time of inference and a correct label corresponding to image data before processing as the third set of image data in the memory in association with each other.

4. The image processing apparatus according to claim 2, wherein the processor is configured to: process any one of a plurality of regions in which a value of the region-of-interest information is different from each other.

5. An image processing method executed by a computer, the image processing method comprising:
generating a trained machine learning model by learning a machine learning model using a first set of image data;
outputting an inference result by inputting a second set of image data to the trained machine learning model;
generating pseudo images by changing a parameter of a region of interest of an image in the second set of image data at a time of inference with respect to image data for which an inference result is correct, the region having a heat map value equal to or greater than a threshold;
storing, in the memory, a third set of image data that is the second set of image data to which the generated pseudo images are added; and
re-training the trained machine learning model by using the third set of image data.

6. The image processing method according to claim 5, further comprising:
identifying the image data for which the inference result is correct in the second set of image data; and
generating region-of-interest information indicating the region of interest at a time of inference based on feature region information calculated at the time of inference for the identified image data for which the inference result is correct.

7. The image processing method according to claim 6, further comprising storing image data obtained by processing the region of interest at a time of inference and a correct label corresponding to image data before processing as the third set of image data in the memory in association with each other.

8. The image processing method according to claim 6, wherein the image processing method comprising: processing any one of a plurality of regions in which a value of the region-of-interest information is different from each other.

9. A non-transitory computer-readable storage medium storing a program that causes a computer to execute a process, the process comprising:
   generating a trained machine learning model by learning a machine learning model using a first set of image data;
   outputting an inference result by inputting a second set of image data to the trained machine learning model;
   generating pseudo images by changing a parameter of a region of interest of an image in the second set of image data at a time of inference with respect to image data for which an inference result is correct, the region having a heat map value equal to or greater than a threshold;
   storing, in the memory, a third set of image data that is the second set of image data to which the generated pseudo images are added; and
   re-training the trained machine learning model by using the third set of image data.

10. The image processing apparatus according to claim 1, wherein the certain padding process is selected from noise addition, smoothing, and contrast adjustment.

11. The image processing method according to claim 5, wherein the certain padding process is selected from noise addition, smoothing, and contrast adjustment.

* * * * *